(12) United States Patent
Kennedy

(10) Patent No.: US 7,275,455 B2
(45) Date of Patent: Oct. 2, 2007

(54) AUTOMATIC GEAR SYSTEM

(75) Inventor: Ian Duncan Kennedy, Whitnash (GB)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 229 days.

(21) Appl. No.: 10/489,571

(22) PCT Filed: Sep. 10, 2002

(86) PCT No.: PCT/DE02/03349

§ 371 (c)(1),
(2), (4) Date: Oct. 6, 2004

(87) PCT Pub. No.: WO03/025434

PCT Pub. Date: Mar. 27, 2003

(65) Prior Publication Data

US 2005/0043139 A1    Feb. 24, 2005

(30) Foreign Application Priority Data

Sep. 12, 2001  (GB) ................................ 0121923.7

(51) Int. Cl.
  F16H 59/60  (2006.01)
  F16H 59/00  (2006.01)
  F16H 61/00  (2006.01)
  F16H 63/00  (2006.01)

(52) U.S. Cl. ................... 74/335; 74/336 R; 477/97

(58) Field of Classification Search ............. 74/335, 74/336 R; 477/70, 76, 97, 98
See application file for complete search history.

(56) References Cited

U.S. PATENT DOCUMENTS

| 4,856,360 | A | * | 8/1989 | Yoshimura et al. ........... 74/335 |
| 5,138,905 | A | * | 8/1992 | Kouno ........................ 477/80 |
| 5,899,829 | A |   | 5/1999 | Salecker et al. .............. 477/78 |
| 5,910,068 | A |   | 6/1999 | Krauss et al. ................ 477/109 |
| 5,925,086 | A | * | 7/1999 | Sakai et al. .................... 701/66 |
| 6,070,117 | A | * | 5/2000 | Yamada et al. ................ 701/50 |
| 6,145,398 | A | * | 11/2000 | Bansbach et al. ............ 74/335 |
| 6,164,149 | A | * | 12/2000 | Ohmori et al. .......... 74/336 R |
| 6,295,884 | B1 |   | 10/2001 | Miyake et al. ............... 74/335 |
| 6,393,928 | B1 |   | 5/2002 | Watanabe .................... 74/336 |
| 6,524,215 | B1 | * | 2/2003 | Schmidt ........................ 477/3 |
| 2002/0046618 | A1 | * | 4/2002 | Yamashita et al. ............ 74/335 |

FOREIGN PATENT DOCUMENTS

| DE | 195 04 847 A1 | 9/1995 |
| DE | 196 27 980 A1 | 1/1997 |
| DE | 197 34 023 A1 | 2/1998 |
| DE | 199 61 117 A1 | 7/2001 |
| EP | 0 038 113 B1 | 10/1981 |
| EP | 0 043 660 B1 | 1/1982 |

(Continued)

*Primary Examiner*—Tisha Lewis
(74) *Attorney, Agent, or Firm*—Simpson & Simpson, PLLC

(57) ABSTRACT

The present invention broadly comprises a method for the control of a gear engagement mechanism of an automated multiple-ratio transmission having at least one drive shaft and at least one output shaft, including assigning a synchronizer to at least one gear step, applying a load to the synchronizer in order to engage or disengage a gear step of the transmission, and varying the load that is applied to the synchronizer as a function of the service life of the transmission system.

3 Claims, 4 Drawing Sheets

FOREIGN PATENT DOCUMENTS

| | | |
|---|---|---|
| EP | 0 059 035 B1 | 9/1982 |
| EP | 0 101 220 B1 | 2/1984 |
| EP | 0 477 564 B1 | 4/1992 |
| EP | 0 976 955 B1 | 2/2000 |
| EP | 1 081 417 B1 | 3/2001 |
| GB | 2 308 413 A | 6/1997 |
| GB | 2 354 295 A | 3/2001 |
| GB | 2 354 296 A | 3/2001 |
| GB | 2 358 443 A | 7/2001 |
| GB | 2 360 557 A | 9/2001 |
| GB | 2 369 654 A | 6/2002 |
| GB | 2 369 656 A | 6/2002 |
| GB | 2 369 657 A | 6/2002 |
| GB | 2 370 611 A | 7/2002 |
| GB | 2 370 865 A | 7/2002 |
| WO | WO92/13208 | 8/1992 |
| WO | WO97/05410 | 2/1997 |
| WO | WO97/10456 | 3/1997 |

\* cited by examiner

AUTOMATIC GEAR SYSTEM

CROSS REFERENCE TO RELATED APPLICATIONS

The present application is the U.S. national stage application pursuant to 35 U.S.C. §371 of International Application No. PCT/DE02/03349, filed Sep. 10, 2002, which application claims benefit of British Patent Application No. 0121923.7, filed Sep. 12, 2001, which applications are incorporated herein by reference.

BACKGROUND OF THE INVENTION

The present invention relates to automated transmission systems, and in particular automated manual, semi-automatic and fully automatic transmission systems that use a multiple-ratio transmission that has synchronizers on the gear steps.

In automated transmission systems that use multiple-ratio transmissions in which the engagement of the gears is regulated by synchronizers, as are disclosed in, for example, GB2308413; GB2354296; GB2354295; GB2358443; GB0105186.1; GB0029453.8; GB0026423.4; GB0025848.3; GB0025847.5; GB0029454.6; GB0025000.1; GB0024999.5; GB0026178.4; GB0027640.2; GB0028310.1; GB0031624.0; GB103312.5, whereby reference will be made exclusively to these disclosures and their content is incorporated in the disclosure content of the present application; the synchronizer is used to brake or accelerate the drive shaft of the transmission until the speed for the intended target gear is reached. Therefore, the synchronizer, as far as its action is concerned, is a friction device that is capable of transmitting a limited torque. The required torque is determined by the inertia of the drive shaft and by the time that is available for the complete synchronization. The synchronization time is a function of the magnitude of the required speed change. Traditionally, the synchronizers that are associated with the various gears have different performance capabilities that take into account the intended braking torque, the frequency of use and the average speed change.

It is desirable to regulate the torsional force that acts on the synchronizers in order to ensure that the torque acting on them, and consequently the synchronizer wear, do not become too great. Previously, this was achieved by regulating the force that acts on the synchronizer via an actuating mechanism, the actuating force corresponding to an optimal torsional force for the synchronizer that is empirically predetermined on the basis of steady load tests by the transmission manufacturer.

The torsional forces that act on the synchronizers change along with the speed change and also with the temperature changes of the transmission oil. Adjustments may be implemented via the actuation force that acts on the synchronizers in order to incorporate such changes. However, such changes can only be approximations and, while the regulation of the actuation force on the synchronizers is improved, it cannot be guaranteed that the torsional forces corresponding to the predetermined maximum synchronization forces prescribed by the manufacturer are not exceeded. Moreover, in order to implement such adjustments, additional sensors are required to record changes in the temperature and speed differentials.

Furthermore, other factors, such as the wear of the components mounted on the transmission drive shaft, and especially a driven clutch plate, and changes in the friction coefficient of the synchronizer that are not foreseeable and are not precisely applicable for the adjustments also have effects on the torque that is applied by the synchronizer and on the rate of change of the drive shaft speed.

SUMMARY OF THE INVENTION

According to one aspect of the present invention, a method for regulating a gear engagement mechanism of an automated multiple-ratio transmission, which has a drive shaft and at least one synchronizer, includes the application of a load to the synchronizer in order to engage or disengage a gear step of the transmission, whereby the load that acts on the synchronizer is calculated as a function of a transmission parameter that changes over time, for example, the rate of change of the drive shaft speed. For this purpose, the monitoring of the drive shaft speed directly via a transmission input speed sensor or the indirect determination of it via additional sensors and measured values, for example of gear information, at least one speed sensor, one clutch travel sensor, one engine speed sensor and/or one throttle flap position as well as the evaluation of stored and/or adaptable value groups of an engine characteristic map may be advantageous.

Because the change of a transmission parameter, for example, the speed of the drive shaft, may permit conclusions about the magnitude of the torque that acts on the synchronizer, the load that acts on the synchronizer may be regulated in this manner to ensure that the maximum synchronizer force that is prescribed by the manufacturer is not exceeded.

According to a preferred embodiment of the invention, an automated transmission system comprises a multiple-ratio transmission having a synchronizer by means of which the gear steps are connected in a driven manner and, between a drive shaft and a transmission output shaft, means for applying a load to the synchronizer in order to engage and disengage the gear steps, a closed-loop control circuit being provided in order to regulate the load that acts on the synchronizer as a function of the rate of change of the transmission parameter.

BRIEF DESCRIPTION OF THE DRAWINGS

The invention is now described, merely for purposes of example, with reference to the accompanying drawings, of which.

DETAILED DESCRIPTION OF THE PREFERRED EMBODIMENT

Figure 1:
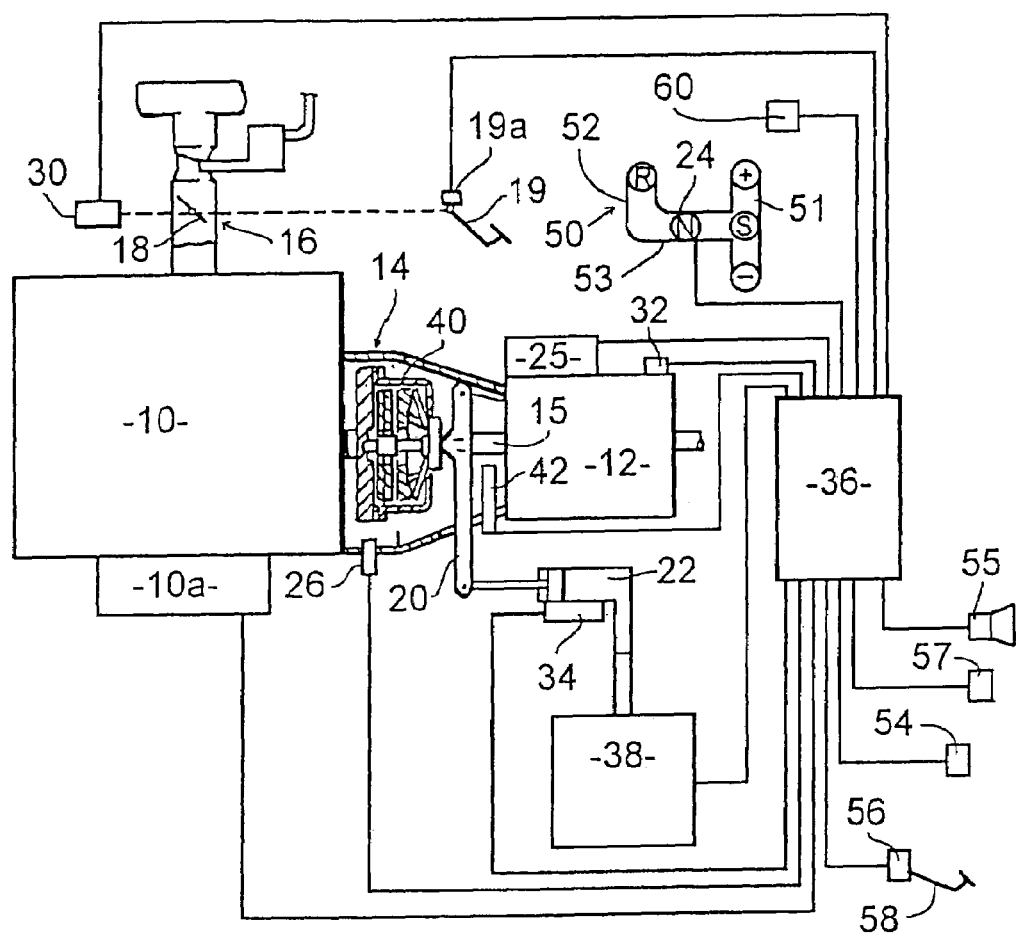
FIG. 1 shows a semi-automatic transmission system that uses a hydraulic circuit according to the present invention.

FIG. 1 of the accompanying drawings shows an engine 10 having a starter and an associated starter circuit 1a that is coupled by main drive friction clutch 14 via a transmission drive shaft 15 to a multiple-ratio, synchronized transmission 12 of the type having a countershaft. The engine is supplied with fuel via a throttle flap 16, the throttle flap comprising a throttle valve 18 that is actuated by gas pedal 19. The invention is equally applicable for gas or diesel engines with electronic or mechanical fuel injection.

Clutch 14 is actuated by a clutch fork 20 that is actuated in turn by a sequence-controlled hydraulic cylinder 22 that is under the control of a clutch actuator control mechanism 38.

A gear selection lever 24 operates in a shift gate 50 having two legs 51 and 52 that are linked by a transverse track 53 that extends between the end of leg 52 and a position between the ends of leg 51. Shift gate 50 defines five positions; "R" at the end of leg 52; "N" in the center between the ends of transverse track 53; "S" at the junction point of leg 51. In leg 51 lever 24 is aligned at the starting point with central position "S". Position "N" of selection lever 24 corresponds to neutral; "R" corresponds to the selection of the reverse gear; "S" corresponds to the selection of a forward drive gear; the short-term movement of the lever into the "+" position represents a command that causes the transmission to shift up one gear step; and the short-term movement of gear lever 24 into the "−" position represents a command that causes the transmission to shift down one gear step.

The positions of lever 24 are recorded by a series of sensors, for example microswitches or optic sensors, that are disposed around shift gate 50. The signals of the sensors are supplied to an electronic control unit 36.

An output of the control unit 36 controls a gear engagement mechanism 25 that engages the gear steps of transmission 12 according to the movement of selection lever 24 by the driver of the vehicle.

In addition to the signals of gear selection lever 24, control unit 36 receives signals from:

Sensor 19a, which indicates the degree to which gas pedal 19 is depressed;
Sensor 30, which indicates the degree to which throttle valve 18 is opened;
Sensor 26, which indicates the engine speed;
Sensor 42, which indicates the speed of the driven clutch plate;
Sensor 34, which indicates the position of the sequence-controlled clutch cylinder; and
Sensor 32, which indicates the selected shift step.

Control unit 36 uses the signals of these sensors to control the actuation of clutch 14 while starting out from the idle position and during gear change, as is described in patent descriptions of EP0038113, EP0043660, EP 0059035, EP0101220 and WO92/13208, whose contents are expressly included in the disclosure content of the present invention.

In addition to the aforementioned sensors, control unit 36 also receives signals from a vehicle speedometer 57, from ignition lock 54 and from brake light switch 56, which is a part of the main braking system of the vehicle, for example, foot brake 58.

A buzzer 52 is connected to control unit 36 in order to warn the driver of the vehicle or indicate to him if certain operating states arise. In addition to or instead of buzzer 52, a flashing warning light or other indication means may be used. A gear indicator 60 is also provided in order to indicate the selected gear.

Figure 2:
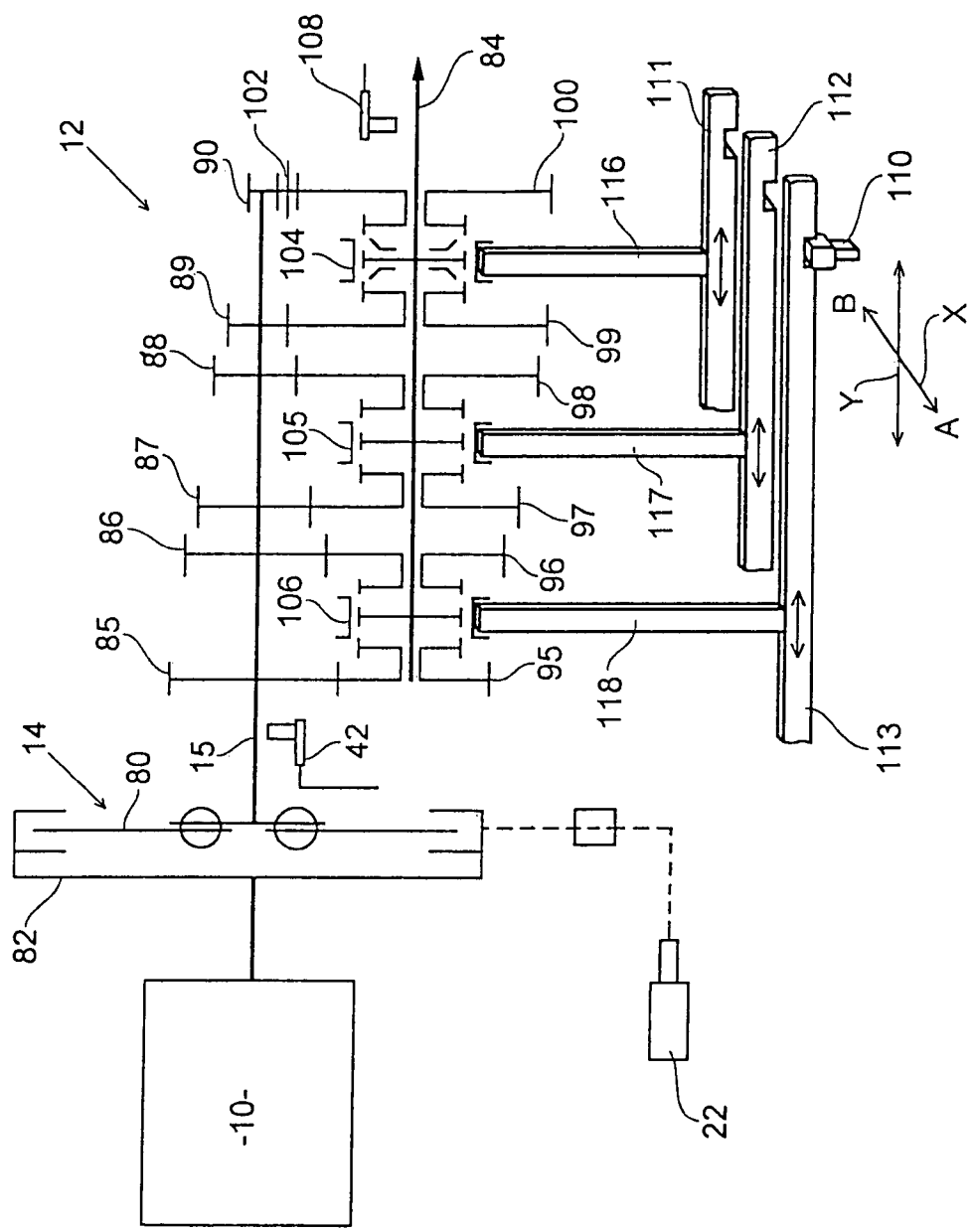
FIG. 2 schematically represents a multiple-ratio transmission that is used in the transmission system in FIG. 1.

As illustrated in FIG. 2, an output shaft 84 from transmission 12 is installed parallel to drive shaft 15. A series of gears 85 to 90 is mounted on drive shaft 15 in order to turn with it. A matching series of gears 95 to 100 are attached to the output shaft 84 for rotation in relation to said first series. Gears 85 to 89 and gears 95 to 99 are disposed in mating pairs and thus harmonized in their sizes in order to provide the different gear steps; gears 85 and 95 provide a fifth gear; gears 86 and 86 provide a fourth gear; gears 87 and 97 provide a third gear; gears 88 and 98 provide a second gear; gears 89 and 99 provide a first gear. Another gear engages between gears 90 and 100 to reverse the direction of rotation and provides a reverse gear.

Synchronizers 104, 105, 106 are located between gears 99 and 100; 97 and 98; and 95 and 96, respectively. The axial movement of synchronizer 104 to the left, as represented in FIG. 2, thereby engages gear 99 in a rotary connection with output shaft 84, while the axial movement of synchronizer 104 to the right engages gear 100 in a rotary connection with output shaft 84. In a similar manner, the axial movement of synchronizer 105 engages 97 or gear 98, depending on the selection, in a rotary connection with output shaft 84, and the axial movement of synchronizer 106 engages gear 95 or gear 96, depending on the selection, in a rotary connection with output shaft 84.

Speed sensors 42 and 108 are available to monitor the speed of transmission drive shaft 15 and transmission output shaft 84 and provide signals that are proportional to said speeds and are sent to electronic control unit 36.

The gear engagement mechanism 25 comprises three shift rails 111, 112, 113 that are mounted parallel to each other for the axial directional movement. Each shift rail 111, 112, 113 is connected via a shift fork 116, 117, 118 to another synchronizer 104, 105, 106 so the movement of the shift rails 111, 112, 113 in an axial direction causes the engagement of one of the gears that are assigned to the corresponding synchronizer 104, 105, 106, and the axial movement of the shift rails 111, 112, 113 in the opposite axial direction causes the engagement of the other gear that is assigned to corresponding synchronizer 104, 105, 106.

A shifter element 110 is mounted for a movement in a first direction X transverse to the axes of shift rails 111, 112, 113 and mounted in a second direction Y, which represents an axial movement with respect to shift rails 111, 112 and 113. The shifter element 110 can therefore be moved in a selected direction X along a neutral level A-B so that it can be latched with one of the shift rails 111, 112, 113 and can then engage in a selected shift rail. Shifter element 110 can then be moved in a shift direction Y in order to move the engaged shift rail 111, 112, 113 axially in one of the two directions in order to engage one of the gears that is connected to it.

Figure 3:
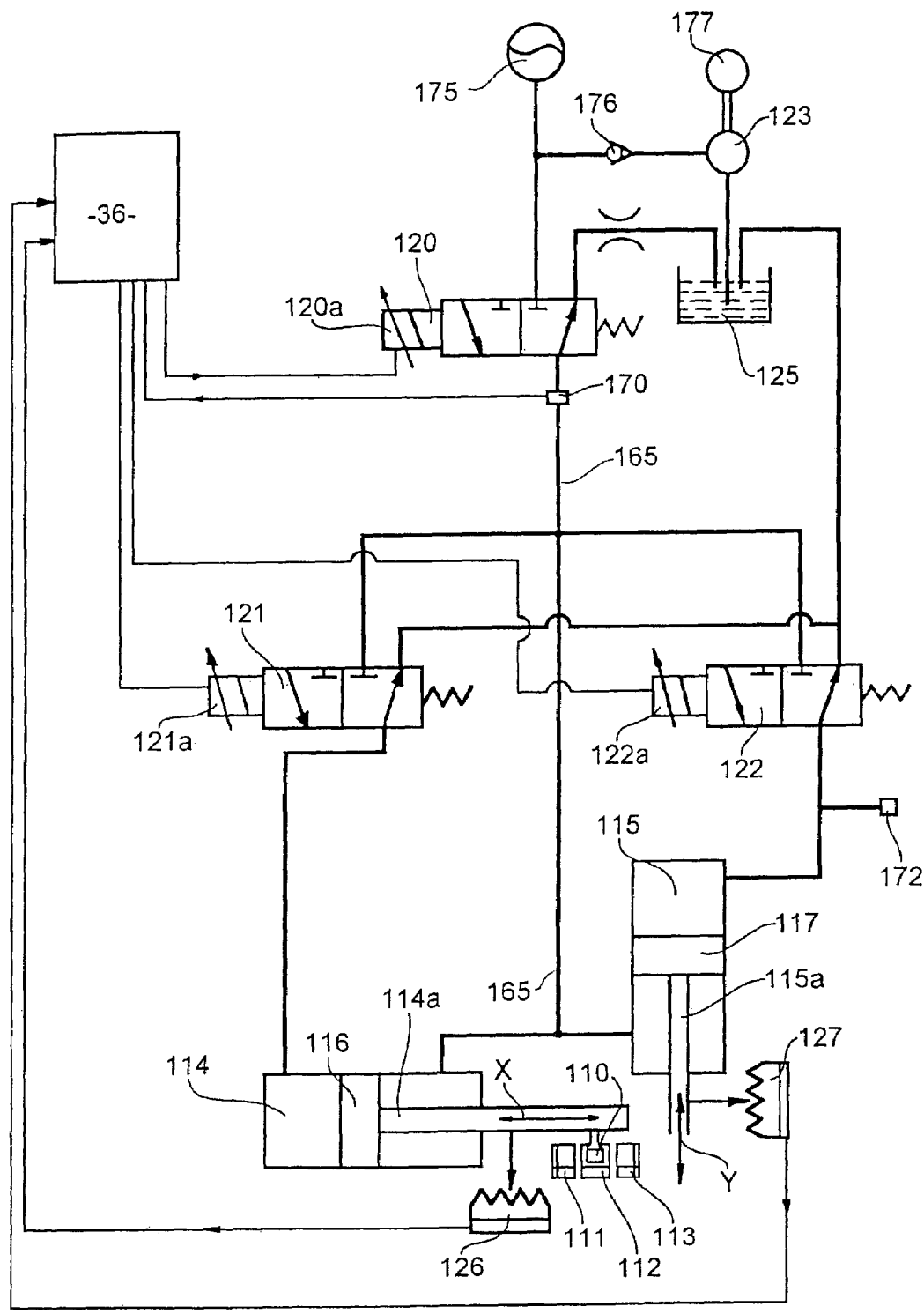
FIG. 3 schematically shows a hydraulic control system for the gear engagement mechanism of the transmission that is represented in FIG. 2.

As represented in FIG. 3, the shifter element 110 is moveable in the selected direction X via a first actuator 114, which is actuated by fluid pressure, along neutral level A-B in order to align shifter element 110 with one of shift rails 111, 112 or 113 and thereby select a pair of gears that is connected with synchronizer 104, 105, 106, which in turn is controlled by shift rail 111, 112 or 113. The shifter element 110 can be moved in the shift direction Y via a second actuator 115 actuated by fluid pressure in order to move the shift guide 111, 112 or 113 axially in one of the two directions in order to engage one of the gears that is connected with synchronizer 104, 105, 106, which in turn is controlled by shift rail 111, 112 or 113.

Actuators 114 and 115 each include a double-acting plunger piston having an engaging piston rod 114a or 115a, respectively, that is connected with shifter element 110. Engagement rod 114a is situated on one side of a piston 116 of actuator 114 so the effective surface on the rod-end side of piston 116 is smaller than on the opposite, head side. The same is true for actuator 115; engagement rod 115a sits on one side of a piston so the effective surface on the rod-end side of piston 117 is smaller than on the opposite, head side.

The supply of hydraulic fluid to the rod-end side and head-end side of pistons 116 and 117 is controlled by three valves 120, 121 and 122 that are actuated by solenoids. Valve 120 is an on-off valve that connects the rod sides of pistons 116 and 117 and proportional flow control valves 121 and 122 to the pressurized fluid from a hydraulic source that comprises a pump 123 and an accumulator 175 or connects them to compensating tank 125 via main fluid supply line 165 for the discharge. Valves 121 and 122 can connect head-end sides of pistons 116 and 117 to main control valve 120 or compensating tank 125. A pressure measurement converter 170 is provided in main supply line 165 between main control valve 120 and valves 121 and 122 and rod-end sides 116 and 117, and a pressure measurement converter 172 is provided between the head-end side of piston 117 and valve 122. Valves 120, 121 and 122 are controlled by electronic control unit 36 in order to apply the appropriate pressure to the opposing sides of pistons 116 and 117 in order to control the movement of pistons 116 and 117 and of attached engagement rods 114a and 115a in order to select and engage the required gear in the manner that is disclosed in WO97/05410.

Potentiometers 126 and 127 are connected with engagement rods 114a or 115a in order to provide a signal that marks the position of the attached engagement rod. The signals of potentiometer 126 and 127 are supplied to control unit 36 in order to provide an indication of the position of engagement rods 114a and 115a for each of the gear steps of the transmission and also in order to mark the position of engagement rod 115a if shifter element 110 is located in neutral level A-B from FIG. 2. In this way, the transmission system can be calibrated so that predetermined position signals that come from potentiometers 126 and 127 correspond to the engagement of each of the gears of transmission 15.

Measured results of potentiometer 126 and 127 may then be used by a closed-loop control system to control valves 120, 121 and 122 in order to move engagement rods 114a and 115a to the predetermined positions to engage the desired gear.

In a first position of main control valve 120, high pressure accumulator 175 is connected via main supply line 165 to the rod-end side of pistons 116 and 117 of actuator 114 or 115, respectively, and valves 121 and 122.

Valves 121 and 122 can then be controlled in order to selectively connect head-end sides of pistons 116 and 117 to accumulator 175 or compensating tank 125. If the head-end sides of piston 116 and 117 are connected to accumulator 175, the pressure that acts on both sides of pistons 116 and 117 is the same, but because of the difference in the effective surfaces of the rod-end sides and the head-end sides of pistons 116 and 117, pistons 116 and 117 are moved to the right or downward as illustrated in FIG. 3.

If the head-end sides of pistons 116 and 117 are connected via valves 121 or 122 to compensating tank 125, the pressure difference around pistons 116 and 117 moves piston 116 and 117 to the left and to the right, respectively, as illustrated in FIG. 3, the fluid from the head end side of pistons 116 and 117 being pressed out into compensating tank 125. The movement of shifter element 110 can therefore be controlled in order to bring about the engagement of the desired gear by controlling main valve 120 in order to connect main supply line 165 to accumulator 175 and by operating valves 121 and 122 in order to move shifter element 110 accordingly in directions X and Y, respectively.

When the gear change is completed, main control valve 120 is switched in such a manner as to connect main supply line 165 to compensating tank 125, which allows the return of the fluid from the rod-end side of piston 116 and 117 and the head-end side of pistons 116 and 117 via valves 121 and 122.

In order to maximize the service life of synchronizers 104, 105, 106, it is desirable to limit the loads that act on them. This may be achieved by skillful operation of valves 120, 122, in that valves 120, 122 are rapidly switched between a position in which the head-end side of piston 117 is connected to compensating tank 125 and a position in which the head-end side of piston 117 is connected to accumulator 175 in order to precisely control the pressure difference around piston 117. Other means, such as a proportional pressure control valve or the method that is disclosed in GB 0024999 or GB 0025000, whose content is expressly included in the disclosure content of the present invention, may alternatively be used in order to control the pressure difference around piston 117 and as a result the load that acts on the synchronizer that is assigned to the selected gear.

Figure 4:
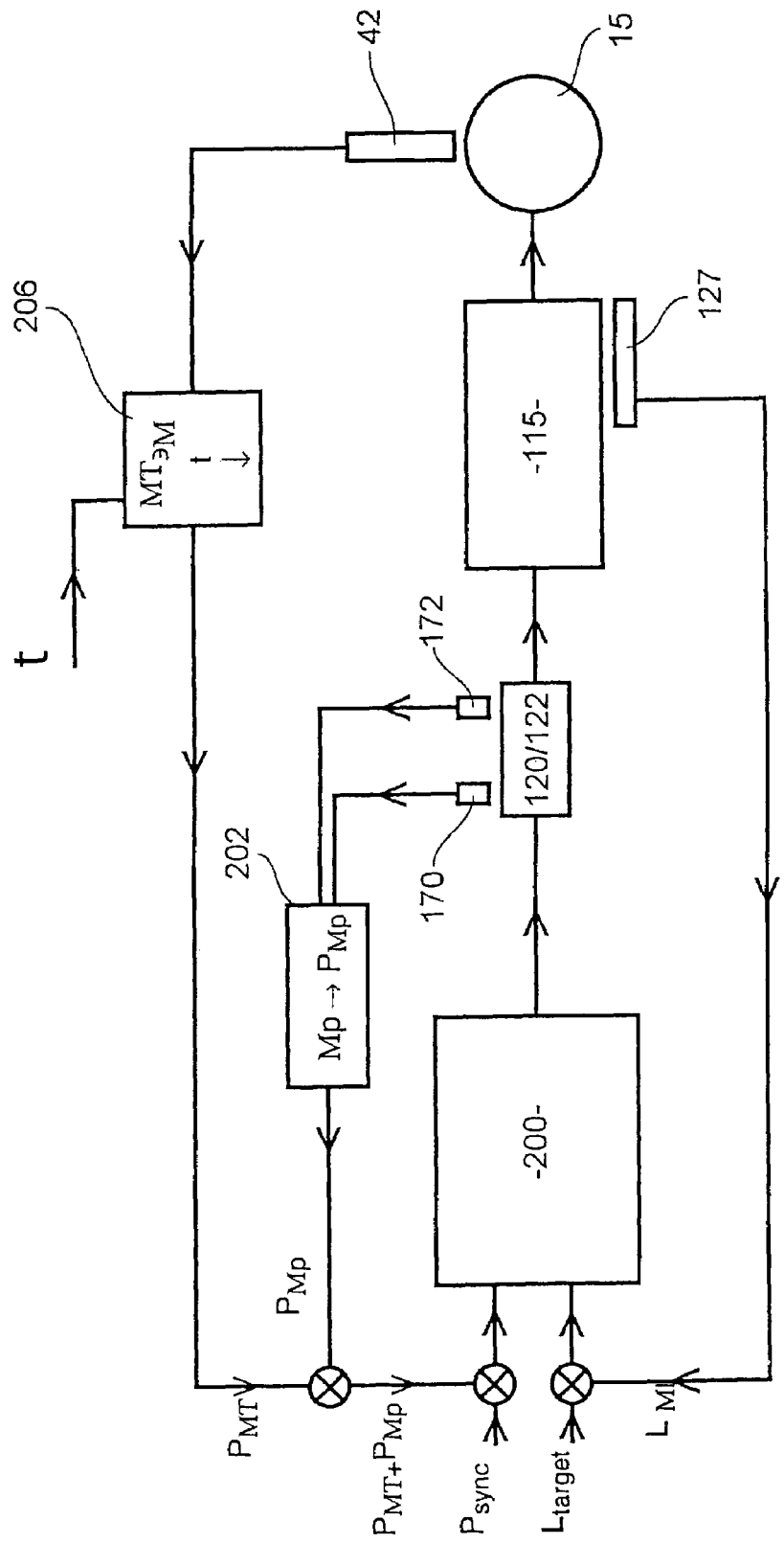
FIG. 4 schematically shows a control circuit for the hydraulic control system that is represented in FIG. 3.

As illustrated in FIG. 4, if a gear change is initiated when clutch 14 has been disengaged, control unit 36 generates a position signal $L_{AB}$, which corresponds to the position on neutral plane A-B, and a pressure signal $P_0$, which corresponds to the force required to move synchronizer 104, 105, 106, which is assigned to the gear engaged at this moment, from the gear engagement position to the neutral level. Position signal $L_{AB}$ and pressure signal $P_0$ are fed to a controller 200, which generates a signal in order to excite valves 120 and 122 in order to apply a pressure differential around actuator 115 in order to move synchronizer 104, 105, 106 the gear engaged at this time is disengaged. Because the drive and output shafts 42, 84 of transmission 12 are synchronized, the loads on synchronizer 104, 105, 106 are negligible. So the pressure difference on sliding actuator 115 can be maximized in order to achieve a rapid disengagement of the gear engaged at this point in time. Position sensor 127, which is attached to actuator 115, indicates a status signal to control unit 36, which is used to modify position signal $L_{AB}$ by adding or subtracting a correction factor $L_{Mp}$, which is calculated as a function of the difference between the actual position of positioning member 115 and the position that is required for reaching the neutral level A-B so the shifter element 110 is moved swiftly and precisely to neutral level A-B.

Valves 120 and 121 are then skillfully operated in order to move actuator 114 to a position in which shifter element 110 ends up engaged with the shift rail 111, 112, 113 that is assigned to the target gear. On the other hand, this may also be done in that the maximum pressure difference around actuator 114 is used, the position signal that is generated by control unit 36 is in turn modified by a closed-loop feedback control circuit, the signal of position sensor 126 being used in the manner described above.

Control unit 36 then generates a position signal $L_{target}$ and pressure signal $P_{target}$, which correspond to the target gear. Pressure signal $P_{target}$ may initially be high in order to bring the synchronizer rapidly into frictional engagement, but pressure signal $P_{target}$ is then weakened to $P_{Sync}$ in order to limit the torsional force that acts on synchronizer 104, 105, 106. $P_{Sync}$ is a predetermined value that is a function of the type of synchronizer 104, 105, 106 and is typically different from one synchronizer 104, 105, 106 to the other. Pressure measurement converters 170 and 172 measure the pressure difference around sliding actuator 115 and provide a signal $P_{Mp}$ that is used to correct pressure signal $P_{Sync}$ via a closed-loop feedback circuit 202. Position sensor 127 also provides a closed-loop feedback control of position signal $L_{target}$ in the manner described above.

Moreover, according to the present invention, the signal that comes from drive shaft speed sensor 42 is processed in order to provide a signal that corresponds to the rate of change of the speed of drive shaft 15.

This is converted into another pressure signal $P_{MT}$, which corresponds to the difference between the actual rate of change of the drive shaft speed and a predetermined optimal rate of change of the drive shaft speed for a given synchronizer 104, 105, 106 and which brings about a further correction of the pressure signal via a closed-loop feedback control 206. In this way, the actual application of the actuator load on the synchronizer is monitored so as to ensure that the synchronization forces that are prescribed by the manufacturer are not continually exceeded. Because the rate of change of the speed of drive shaft 15 reflects the torque that acts on synchronizer 104, 105, 106, closed-loop feedback control 206 also corrects deviations that occur due to changes in the moment of inertia of drive shaft 15, changes in the friction of drive shaft 15 on the basis of the viscosity of the transmission oil and changes in the speed differential between drive shaft 15 and output shaft 84.

As depicted in FIG. 4, pressure correction signal $P_{MT}$ may be adjusted exclusively or in conjunction with the change in the speed of the transmission input shaft in relation to the temperature of the transmission oil. Another input t is applied to the closed-loop feedback circuit, the input t being an estimate of the transmission oil temperature, which is based on the coolant and intake air temperatures of the motor vehicle. This estimated value of the transmission oil temperature can be used to modify the correction factor $P_{MT}$ in order to include the transmission oil temperature and thus its viscosity. For precise comparisons, it may be advantageous to use a sensor for the transmission oil temperature.

According to an alternative embodiment of the invention, the drive shaft feedback loop, instead of being used to form a pressure correction factor $P_{MT}$, may be used to incrementally increase or decrease the pressure signal, this being a function of whether the rate of change in the speed of the drive shaft is above or below the predetermined optimal value. That means that the load which is applied to the synchronization unit is increased by an increment if the rate of change of the speed of drive shaft 15 is above the pre-determined optimum value.

According to another embodiment of the present invention, the rate of change in the speed of drive shaft 15 is used instead of the pressure signals that come from measurement converters 170 and 172, whereupon there is no need for measurement converter 172 and feedback loop 202.

The rate of change in the correction of the drive speed may be used according to the present invention in order to determine independent individual settings for different operating strategies or operating modes, for example for the use of a lower synchronization speed in the saver switching operating mode, in order to extend the service life of the transmission; meanwhile, greater synchronization speeds are permitted for a better output in sport operating mode. Furthermore, different parameters may be used over the service life of the transmission. For example, the optimum rate of change of the drive shaft speeds can be raised after the gear starts running.

While the embodiments that have been described above use hydraulic actuators, the present invention is equally applicable for other forms of actuators, for example, for pneumatic or electric actuators, as described, for example, in DE19504847, WO97/10456 or DE19734023, their disclosures being included herewith for purposes of referral.

Of course, instead of a hydraulic drive, also actuation means for the engagement and disengagement of gears and electric drives for the engagement and disengagement of the clutch are usable that may be controlled or regulated accordingly by specification of the electrical energy. Thus, for example, for specification of the load on the at least one synchronizer, the current, the voltage, a pulse width or the like of the actuation element may be controlled or regulated. Appropriate systems for a transmission actuation of this type are known, for example from DE 196 27 980 A1.

The patent claims submitted along with the application are formulation proposals without prejudice for the attainment of ongoing patent protection. The applicant reserves the right to claim additional feature combinations that so far are only disclosed in the description and/or drawings.

References used in the dependent claims point to the further formation of the subject matter of the main claim by the features of each dependent claim; they are not to be understood as renunciation of the attainment of a separate, concrete protection for the feature combinations of the referred dependent claims.

Because the subject matter of the dependent claims may form separate and independent inventions with respect to the state of the art on the priority date, the applicant reserves the right to make them the subject matter of independent claims or separation statements. They may furthermore also include independent inventions that have a configuration independent of the subject matters of prior dependent claims.

The exemplary embodiments are not to be understood as a limitation of the invention. Rather, numerous amendments and modifications are possible within the context of the present publication, especially such variants, elements and combinations and/or materials as may be inferred by one skilled in the art with regard to the resolution of the problem using, for example, a combination or modification of individual features or elements or methodological steps that are described in connection with the general description and embodiments as well as the claims and that are contained in the drawings and, using combinable features, lead to a new subject matter or to new methodological steps or methodological sequences, even if they pertain to manufacturing, testing and operating method.

What is claimed is:

1. A method for the control of a gear engagement mechanism of an automated multiple-ratio transmission having at least one drive shaft and at least one output shaft, comprising:

assigning a synchronizer to at least one gear step;

applying a load to the synchronizer in order to engage or disengage a gear step of the transmission; and, varying the load that is applied to the synchronizer as a function of a transmission parameter, in which the load that acts on the synchronizer is controlled as a function of the difference of a to-be-detected value of the transmission parameter and a pre-determined optimal value of the transmission parameter.

2. The method as described in claim 1, in which the load that acts on the synchronizer is incrementally controlled, the load being increased by an increment if the rate of the transmission parameter is below the predetermined optimal value, and the load being reduced by an increment if the rate of the transmission parameter is above the predetermined optimal value.

3. The method as described in claim 1, in which the predetermined optimal rate changes from a first synchronizer to at least one other provided synchronizer.

* * * * *